Aug. 13, 1935.  R. D. SHAW  2,011,086
FORM TURNING LATHE
Filed Aug. 11, 1934
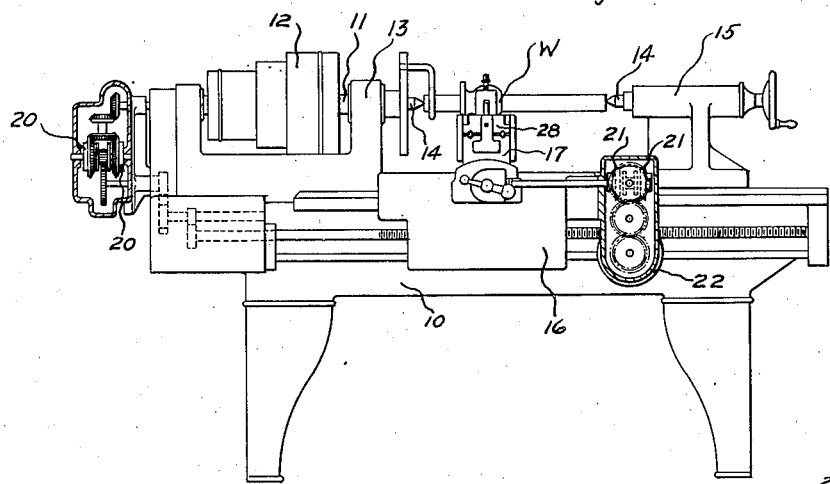
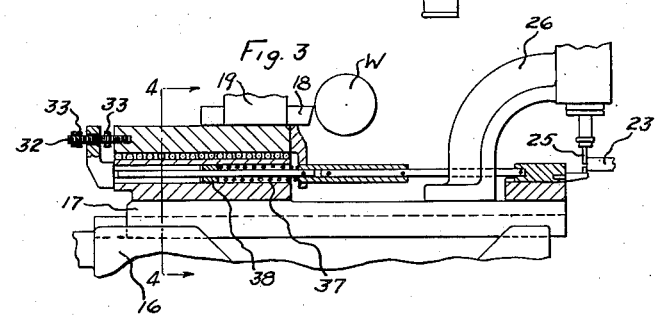
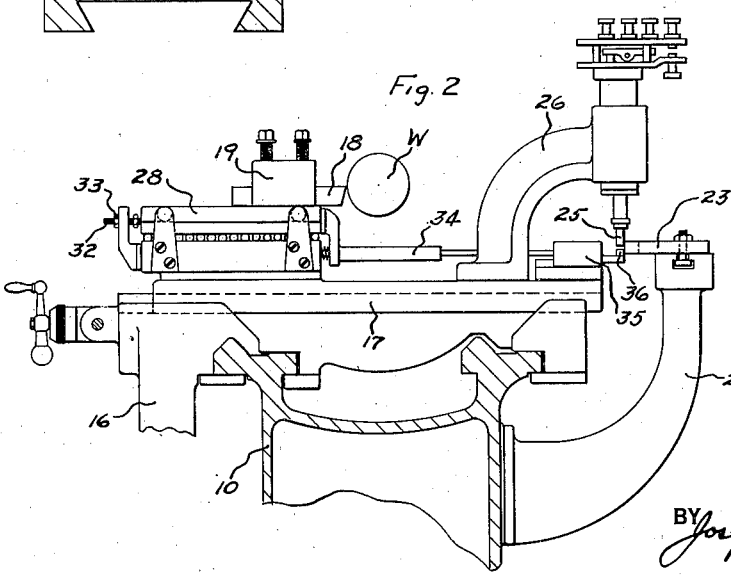
INVENTOR
R. D. Shaw
BY Joseph K. Schofield
ATTORNEY Patented Aug. 13, 1935

2,011,086

UNITED STATES PATENT OFFICE 2,011,086

FORM TURNING LATHE

Robert D. Shaw, Hartford, Conn., assignor to Pratt & Whitney Company, Hartford, Conn., a corporation of New Jersey Application August 11, 1934, Serial No. 739,449

6 Claims. (Cl. 82—14)

This invention relates to metal turning lathes and particularly to a lathe for reproducing turned forms from templates an edge of which is provided with the outline corresponding to the desired configuration.

More particularly the invention relates to an improvement in the tracer controlled and electrically operated form turning lathe shown and described in the patent to Shaw et al. 1,772,431 granted August 5, 1930.

A primary object of the present invention is to provide means enabling a smooth surface to be turned on portions of a work piece having gradually varying slopes so that minute steps or ridges sometimes left on the work piece by the tool may be avoided.

Another object of importance is that resilient means are provided normally forcing the tool and its support toward the work piece being turned relative to the slide mounting the tool support and controlled by the template so that the tool may move a short distance toward or away from the work relative to the slide.

And finally it is an object of the invention to provide means permitting limited movements of the tool and its support relative to the movements of the template controlled slide, the tool being normally forced toward the work against a stop at all times and simultaneously being advanced longitudinally of the work by the carriage or transversely by movement of the cross slide as described in the above referred to patent.

More specifically the invention provides supplemental means for movably supporting the tool in addition to the means shown and described in the above mentioned patent. These supplemental means are mounted on and carried by the transversely movable slide and permit but limited movement of the tool toward and from the work piece relative to the transversely or longitudinally movable slide. Normally these means force the tool and its support resiliently toward the work piece, under the influence of a spring. The pressure of the spring acting upon the supplemental means is just sufficient to hold the tool in its limited position toward the work and against its stop when light finishing cuts upon the work are being taken.

With the above and other objects in view, my invention includes the features of construction and operation set forth in the following specification and illustrated in the accompanying drawing.

In the accompanying drawing annexed hereto and forming a part of this specification, I have shown my invention embodied in an engine lathe of conventional type similar to that shown in the above referred to patent but it will be understood that the invention may be otherwise embodied and that the drawing is not to be construed as defining or limiting the scope of the invention, the claims appended to this specification being relied upon for that purpose.

In the drawing:

Figure 1 is a front elevation of a complete engine lathe provided with the present invention.

Fig. 2 is a transverse sectional view upon an enlarged scale compared to Fig. 1 showing the longitudinal and transversely movable slides, the template, tracer and tool support in side elevation.

Fig. 3 is a sectional view taken transversely through the tool supporting member showing its connection with the transversely movable slide and the template.

Fig. 4 is a cross sectional view taken substantially upon the line 4—4 of Fig. 3 upon an enlarged scale.

In the above mentioned drawing I have shown but one embodiment of the invention which is now deemed preferable, but it is to be understood that changes and modifications may be made within the scope of the appended claims without departing from the spirit of the invention.

Briefly and in its preferred aspect my invention may be associated with a lathe having the following principal parts: namely, a bed; a longitudinally movable carriage; a transversely movable slide thereon; template and tracer means operating to control either the position of the transverse or longitudinally movable slide during movements of the tool over the work, these parts being all substantially similar to those described in the above mentioned patent. Associated with these parts is a tool support slidably mounted upon the transversely movable slide for movement between closely limited positions, these positions being adjustably varied by suitably adjustable stops, there being resilient means normally forcing the tool support toward the work piece and there being rigid but adjustable connecting means between this tool support and template, the end adjacent the template having a follower preferably of the same diameter as the tracer associated with the electric control system and adapted to contact with the template in alinement with the latter tracer.

Referring more in detail to the figures of the drawing, I provide a lathe bed 10 on which is mounted a work supporting and rotating spindle 11 which may be rotated by any usual means such as the cone pulley 12 mounted within the headstock 13 supporting the spindle 11. In the embodiment of the invention shown in the drawing, work W is supported between centers 14 in the usual manner, one center 14 being mounted on the headstock spindle 11 and the other center 14 in a conventional type of longitudinally adjustable tailstock 15. Mounted on the lathe bed 10 and movable longitudinally thereon is a carriage 16 on which is a transversely movable slide 17 on which the tool 18 is supported by means presently to be more fully described. The carriage 16 is actuated along the lathe bed 10 in either direction by the electromagnetic clutches 20, these clutches being driven by connections from the headstock spindle 11. The transversely movable slide 17 also is actuated by electromagnetic clutches 21 connected thereto as described in the above mentioned patent. These magnetic clutches 21 are preferably operated by a suitable motor 22 mounted upon and movable with the carriage 16.

The above described parts are or may be in every way similar to those described in the above mentioned patent. The template 23 used in this invention is fixed in position upon a suitable rearwardly extending bracket 24 mounted on the lathe bed 10 as in the above referred to patent. This template 23 has its forward longitudinal edge formed to correspond to the outline of the desired object being turned and is engaged by a sensitive electric tracer 25 mounted in a bracket 26 on the transversely movable slide 17. This tracer 25 and the tracer mounting is in every way similar to that shown in the above mentioned patent and, by means of the electromagnetic clutches 20 and 21 referred to above, controls the "in" and "out" movements of the tool 18 during longitudinal movements of the carriage 16 to cut a work piece W to correspond to the template 23 mounted in position upon the lathe. As the above mechanism is fully described in the above mentioned patent, further description is not thought to be necessary. It will suffice to state that the tracer 25 opens and closes contacts controlling circuits energizing the coils of the magnetic clutches 20 and 21. These circuits are or may be identical with those shown and described in the above mentioned patent.

Instead of mounting the tool 18 directly in fixed position upon the slide 17 as in the above referred to patent, the tool support 19 in the present described construction is mounted upon a supplemental slide 28 movable transversely of the lathe upon and in a direction parallel to the direction of motion of the transversely movable slide 17. In order to eliminate friction and facilitate movement of this supplemental slide 28 relative to slide 17, rows of balls 29 are provided as shown in Figs. 3 and 4, these being disposed in appropriate V grooves provided in the supplemental slide 28 and in the transversely movable slide 17. To retain the supplemental slide 28 in position upon slide 17 there may be provided side member gibs 30 secured to the cross slide 17 and having rollers 31 provided as shown in Fig. 4 bearing upon raceways formed in the supplemental slide 28.

To limit movements of the supplemental slide 28 relative to the transversely movable slide 17 to very small distances a threaded member 32 is provided outstanding from the supplemental slide 28 in a direction parallel to the movements of the supplemental and transverse slides 28 and 17 which is provided with adjustable collars 33. The threaded member passes through an opening in a bracket or extension of the slide 17 and by means of the collars 33 limits movements of the supplemental slide 28 relative to slide 17 to any desired short distance. The distance moved by the slide 28 relative to slide 17 is limited to an extremely small one but for clearness is shown somewhat enlarged in Figs. 2 and 3. When the supplemental slide is not being used as when roughing out the work piece the collars 33 may be so positioned as to lock the slide 28 against any movement relative to the slide 17.

Secured to the supplemental slide 28 and extending to the template 23 is a rod 34 the forward end of which is attached to a depending portion of the supplemental slide 28 and the rear end is secured to a block 35 slidable in a portion of the transversely movable slide 17. This block 35 is provided with an angular extension 36 having a cylindrical template engaging projection the diameter of which is equal to the diameter of the template engaging portion of the tracer 25. The tracer 25 and the template engaging projection 36 provided on the block 35 are disposed so that they will each bear upon exactly the same portion of the outline of the template 23. When not in contact with the template 23 the projection 36 will be urged by the spring 37 so that it will be in advance of the tracer 25 by a small amount, approximately one sixty-fourth of an inch. This amount of advance is adjusted by means of the collars 33 on screw 32.

In order to normally and constantly force the supplemental slide 28 and its connections toward the template 23 during transverse movements of the slide 17 effected by the electrically operated means controlled by the tracer 25, and to simultaneously force the tool toward the work, a spring 37 is interposed between the slides 17 and 28. Preferably this spring 37 may be located within a threaded opening in the transversely movable slide 17, there being a threaded member 38 within this opening abutting against one end of the spring 37. The position of this threaded member 38 within the opening may be varied to control the pressure of the spring 37.

During operation of the lathe and during longitudinal movements of the slide or carriage 16 the tool 18 and the slide 17 are actuated toward and from the axis of the work piece W under control of the tracer 25 following the front edge of the template 23. During this operation the supplemental slide 28 is constantly urged toward the axis of the work by its spring 37.

Primarily the above mechanism is used for taking the final cut upon a work piece after the form has been roughly turned to shape. During the roughing operation the slide 28 may be locked securely in fixed position relative to slide 17 by adjustment of the nuts 33 closely together or by any other preferred means. After the work W has been formed approximately to the shape desired the slide 28 is released and operated as above described. During this finishing operation the amount of metal removed is relatively small and the pressure of the tool against the work relatively light. Spring 37 is adjusted so that its pressure is sufficient at all times while taking the normal slight chip to overcome the tendency of the tool to back away from the work. While operating the projection 36 contacts with the template 23 as shown in Fig. 2, thus limiting the inward position of the slide 28. The rod 34 between the slide 28 and the projection 36 is preferably telescopic so that its length may be readily adjusted in any preferred manner.

The mechanism as described and shown in the specification and drawing is set up for operation upon the external surfaces of a work piece. The machine may, however, be adjusted for operations upon internal surfaces in which the template 23 has its position reversed so that movement of the cross slide 17 forwardly causes the tracer 25 to contact therewith. With the machine adjusted for internal work it is only necessary to readjust the auxiliary tracer 36 in alinement with the electric tracer 25 and reverse the action of spring 37 so that the supplementary slide 28 will be held as far forward as possible. The position of the adjusting nuts 33 will also be adjusted so that limited movement inwardly will be possible of this supplementary slide against the pressure of spring 37. Similarly for face plate work the mechanism can be adjusted to smooth the operation of the machine. In this case the supplemental slide 28 would be positioned for movement longitudinally of the machine and the template would be moved around 90°.

What I claim is:

1. A tracer controlled forming lathe comprising in combination, a base, a slide movable longitudinally along the base during operation of the lathe, a transversely movable slide thereon, a template fixed to said base, a tracer on said transverse slide, means to maintain said tracer in contact with the template during movements of said first slide, a tool support on said transverse slide and movable thereon limited distances in a direction normal to said first slide, resilient means forcing said support toward the template, and a member secured to said tool support and engaging said template for limiting movement of said support relative to the transverse slide.

2. A tracer controlled forming lathe comprising in combination, a base, a slide movable longitudinally along the base during operation of the lathe, a transversely movable slide on said first slide, a template fixed to said base, a tracer on said cross slide, means to maintain said tracer in contact with the template during movements of said first slide, a tool support on said transversely movable slide movable limited adjustable distances in a direction parallel therewith, resilient means forcing said support toward the template, and means limiting movement of the tool support relative to the transversely movable slide.

3. A tracer controlled forming lathe comprising in combination, a base, a slide movable longitudinally along the base, a transversely movable slide on said first slide, a template fixed to said base, a tracer on said cross slide, means to maintain said tracer in contact with the template during movements of said first slide, a tool support on said transversely movable slide movable relative thereto limited distances, adjustable resilient means normally forcing said support toward the template relative to the cross slide, and a member secured to said tool support and engaging said template for limiting movement of said support toward the template.

4. A tracer controlled forming lathe comprising in combination, a base, a slide movable longitudinally along the base, a transversely movable slide on said first slide, a template fixed to said base, a tracer on said cross slide, means to maintain said tracer in contact with the template during movements of said first slide, a tool support on said transversely movable slide movable relative thereto limited distances in a direction transversely of the base, resilient means forcing said support toward the template, and a member secured to said tool support and engaging said template in alinement with the tracer for limiting movement of said support toward the template.

5. A tracer controlled forming lathe comprising in combination, a base, a carriage movable longitudinally along the base, a transversely movable slide on said carriage, a template fixed to said base, a tracer on said cross slide, means to maintain said tracer in contact with the template during movements of said carriage, a tool support on said transversely movable slide movable relative thereto limited distances, resilient means on said transversely movable slide forcing said support toward the template, relative to said slide, and a member secured to said tool support and traversing said template during movement of the longitudinal carriage for limiting movement of said support relative to said transversely movable slide during the cutting operation.

6. A tracer controlled forming lathe comprising in combination, a base, a carriage movable longitudinally along the base, a transversely movable slide on said carriage, a template fixed to said base, a tracer on said cross slide, means to maintain said tracer in contact with the template during movements of said carriage, a tool support on said transversely movable slide movable in a direction parallel therewith, resilient means forcing said support toward the template, a member secured to said tool support and traversing said template during movement of the longitudinal carriage for limiting movement of said support relative to said transversely movable slide during the cutting operation, and adjustable stops limiting in and out movements of the tool support relative to the transversely movable slide.

ROBERT D. SHAW.